United States Patent
Cheng et al.

[11] Patent Number: 6,088,342
[45] Date of Patent: Jul. 11, 2000

[54] DYNAMIC CONFIGURATION OF RADIO LINK PROTOCOL IN A TELECOMMUNICATIONS SYSTEM

[75] Inventors: Mark Cheng, Colleyville, Tex.; Zhichun Honkasalo, Vantaa, Finland

[73] Assignee: Nokia Mobile Phones Limited, Espoo, Finland

[21] Appl. No.: 08/851,010

[22] Filed: May 5, 1997

[51] Int. Cl.[7] .................................................. H04B 7/216
[52] U.S. Cl. ........................................ 370/320; 370/471
[58] Field of Search ...................................... 370/209, 320, 370/342, 394, 395, 433, 441, 465, 470, 471, 472, 476; 379/58, 59; 455/33.1

[56] References Cited

U.S. PATENT DOCUMENTS

| | | | |
|---|---|---|---|
| 4,617,657 | 10/1986 | Drynan et al. | 370/394 |
| 4,779,274 | 10/1988 | Takahashi et al. | 371/32 |
| 5,257,257 | 10/1993 | Chen et al. | 370/18 |
| 5,369,501 | 11/1994 | Wilson et al. | 358/407 |
| 5,640,395 | 6/1997 | Hamalainen et al. | 370/322 |
| 5,708,656 | 1/1998 | Noneman et al. | 370/320 |
| 5,793,744 | 8/1998 | Kanerva et al. | 370/209 |

FOREIGN PATENT DOCUMENTS

| | | |
|---|---|---|
| 0 719 016 A2 | 6/1996 | European Pat. Off. . |
| 0 730 382 A2 | 9/1996 | European Pat. Off. . |
| WO 96/36150 | 11/1996 | WIPO . |
| WO 96/36154 | 11/1996 | WIPO . |
| WO 97/12490 | 4/1997 | WIPO . |

OTHER PUBLICATIONS

Tanenbaum, Andrew S., "Computer Networks", 1993 Prentice–Hall International Inc., pp. 24–26, 373–375.

*Primary Examiner*—Huy D. Vu
*Assistant Examiner*—Alexander Boakye
*Attorney, Agent, or Firm*—Brian T. Rivers

[57] ABSTRACT

A method and apparatus for dynamically configuring parameters of the radio link protocol layer in a telecommunications system. The method and apparatus allows dynamic configuration of the radio link protocol layer in order to optimize parameters for use with a particular data service. In an embodiment of the invention, radio link protocol control frames used for connection initialization include RLP parameter data. The RLP parameter data is exchanged between two communicating transceiving devices during connection initialization, and is used in each transceiving device to configure subsequently transmitted RLP data frames and transmit retransmission requests accordingly.

10 Claims, 6 Drawing Sheets

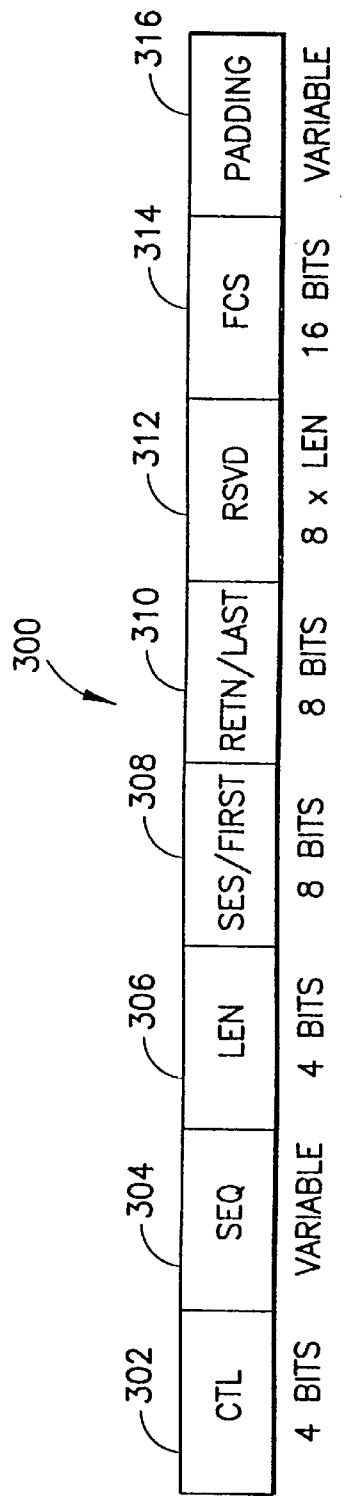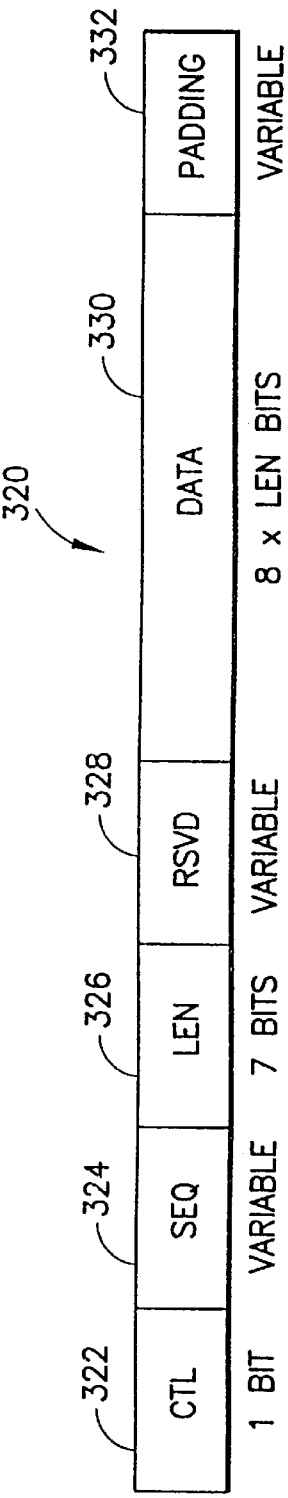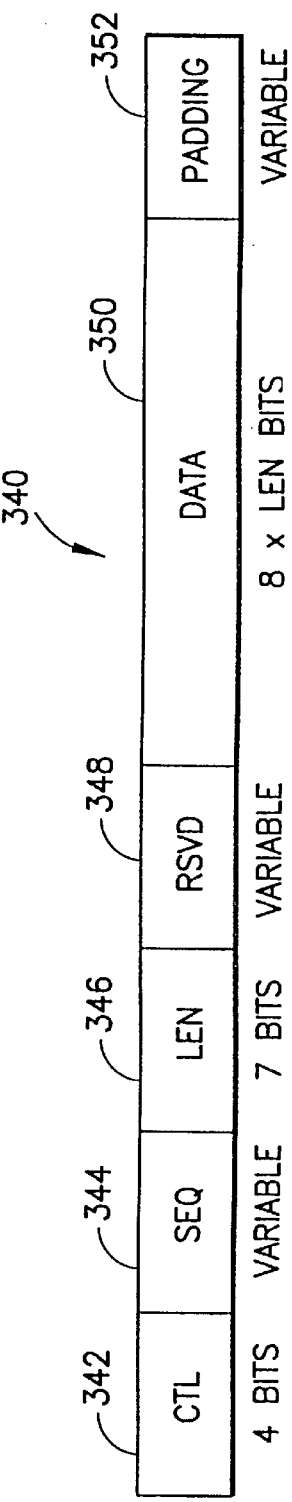

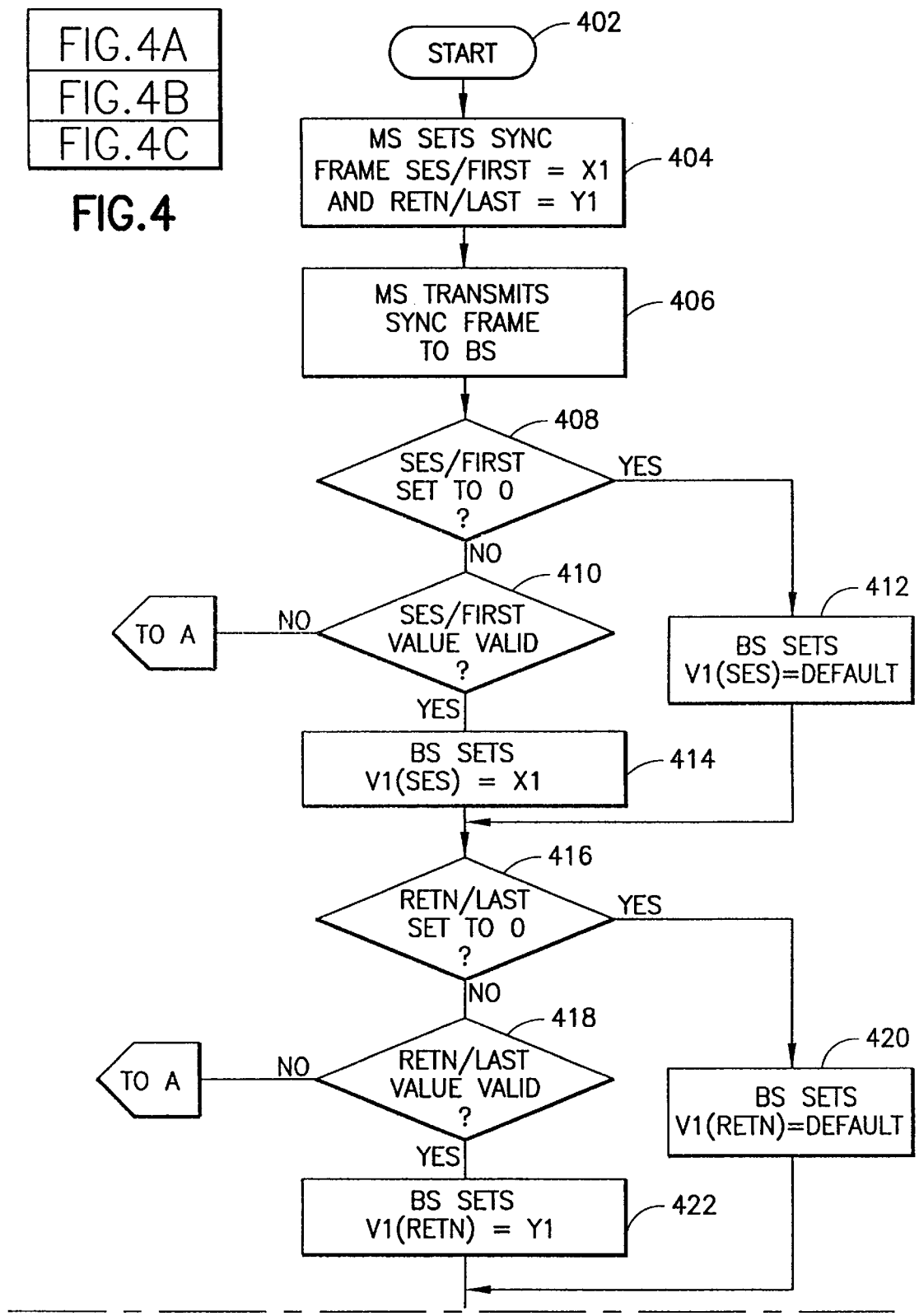

DYNAMIC CONFIGURATION OF RADIO LINK PROTOCOL IN A TELECOMMUNICATIONS SYSTEM

FIELD OF THE INVENTION

This invention relates to telecommunications systems, and, more particularly, to a method and apparatus for dynamically configuring a radio link protocol (RLP) for a telecommunications system.

BACKGROUND OF THE INVENTION

Major cellular system types include those operating according to the Global Services for Mobile(GSM)Standard, the TIA/EIA/IS-95 Mobile Station-Base Station compatibility Standard for Dual Mode Wide Band Spread Spectrum Cellular System, the TIA/EIA/IS-136 Mobile Station-Base Station Compatibility Standard, and the TIA/EIA 553 Analog Standard(AMPS/TACS). Other major cellular systems include those operating in the personal communications system(PCS) band according to the IS-95 based ANSI-J-STD-008 1.8–2.0 Ghz standard or, those operating according to the GSM based PCS1900(1900 Mhz frequency range) standard.

Currently, each of the major cellular systems standards bodies are implementing data services into their digital cellular specifications. A packet data service specification has been finalized for GSM and, packet data service specifications compatible with the IS-95 and IS-136 standards are being prepared. Another example of a data service is the TIA/EIA IS-99 Data Services Option Standard for Wideband Spread Spectrum Digital Cellular System(IS-99). IS-99 defines a connection based packet service for IS-95-A based networks. The IS-99 system provides a standard for asynchronous data service (Service Option 4) and digital Group-3 facsimile service (Service Option 5).

In an IS-99 based system, a radio link protocol (RLP) is utilized to provide an octet stream service over IS-95-A forward and reverse traffic channels. Each octet comprises 8 bits of digital data. The octet stream service carries the variable length data packets of the point to point protocol layer. The RLP divides the point to point protocol packets into IS-95-A traffic channel frames for transmission. There is no direct relationship between point to point protocol packets and IS-95-A frames. A large packet may span several IS-95-A traffic channel frames, or a single traffic channel frame may include all or part of several point to point packets. The RLP does not take the higher level traffic channel framing into account, but operates on a featureless octet stream, delivering the octets in the order received from the point to point layer. The data may be transmitted on the traffic channel as primary traffic, or, for example, along with speech, as secondary traffic. Data may also be transmitted in a signaling subchannel. IS-95 multiplex option 1 may be used at full rate, half rate and eighth rate for primary traffic and at rate 1, rate ⅞, rate ¾, and rate ½, for secondary traffic.

The RLP utilizes RLP control frames to control the transmission of data and RLP data frames for the transmission of data at the RLP level.

The format of RLP control and data frames is defined so that each RLP frame includes a 8-bit sequence number field (SEQ). Each RLP data frame SEQ field contains the sequence number of that particular data frame. The sequence numbers are used to identify each received data frame and allow determination of data frames that have not been received. The RLP control frame SEQ field is not used to indicate the sequence number of the control frame, but contains the next data frame sequence number, to allow quick detection of erased data frames.

In addition to the SEQ field, each RLP data frame includes a number of data bits, with up to a maximum number of data bits allowed for each frame. The maximum number of data bits allowed in a data frame depends upon the IS-95 multiplex subchannel used. For example, for primary traffic on the traffic channel, using multiplex option 1 at IS-95 full rate, the maximum number of data bits allowed is 152, and, for primary traffic on the traffic channel, using multiplex option 2 at IS-95 half rate, the maximum number of data bits allowed is 64. When less than the maximum number of bits are transmitted in a frame, padding is used to fill out the data field to 152 bits. Each RLP data frame also includes a RLP frame type (CTL) field, and a data length (LEN) field. The LEN field indicates the length of the data in the frame in octets. For unsegmented data frames, the CTL frame is one bit and is set to 0. For segmented data frames, the CTL frame contains 4 bits and can be set to indicate whether the data in the frame includes the first LEN octets, the next LEN octets, or, the last LEN octets of the unsegmented data frame.

The RLP control frame may function as a negative acknowledgement (NAK) RLP control frame. A (NAK) RLP control frame includes a 4 bit frame type (CTL) field, a four bit length (LEN) field, an 8 bit FIRST field, an 8 bit LAST field, a reserved field (RSVD), a frame check sequence field (FCS) and padding. An RLP control frame having the frame type field set to indicate negative acknowledgement (NAK) may then be used to request retransmission of a particular data frame, or, a particular sequence of data frames. For example, a mobile station expecting a data frame having a particular sequence number, would transmit a NAK control frame to the base station if the mobile determined that the data frame was missed. The FIRST and LAST fields of the RLP NAK control frame are used to indicate the particular data frame, or, sequence (indicated as a range beginning at the sequence number indicated by the FIRST field and ending at the sequence number indicated by the LAST field) of data frames that are requested to be retransmitted. In IS-99, the number of requests for retransmission of a data frame is a set number and the initiation of the requests for retransmission is controlled by a NAK retransmission timer. When RLP frames are carried as primary or secondary traffic, the retransmission timer is implemented as a frame counter. When RLP frames are carried in the signaling subchannel, the retransmission timer is implemented as a timer having a duration equal to a predetermined value, T1m, that is defined in Appendix D of IS-95-A. The NAK retransmission counter for a data frame is started upon the first transmission of a NAK RLP control frame requesting retransmission of that data frame.

If the data frame has not arrived at the receiver when its NAK retransmission timer expires, the receiver sends a second NAK control frame requesting retransmission of that data frame. This NAK control frame is transmitted twice. The NAK retransmission timer for this data frame is then restarted. If the data frame has not arrived at the receiver when its NAK retransmission timer has expired twice, the receiver sends a third NAK control frame requesting retransmission of that data frame. Each NAK control frame transmitted as the result of a retransmission timer expiring a second time is transmitted three times.

A NAK abort timer is then started in the receiver upon transmission of the third NAK control frame. The NAK abort timer is implemented, and expires, identically to the NAK retransmission timer. If the data frame has not arrived at the receiver when its NAK abort timer has expired, the NAK is aborted and no further NAK control frames are transmitted for that data frame.

The IS-99 NAK scheme results in a maximum number of three retransmission requests, that include a maximum number of six NAK RLP control frames, being transmitted for a particular unreceived data frame.

As cellular telecommunications systems evolve, various high speed data (HSD) service options will be implemented into the different cellular system standards. For example, several HSD options are being considered for implementation into the IS-95-A standard. These HSD options may include IS-95-A based systems having the capability to transmit data at rates of up to 78.8 kbps. Use of any of these options in IS-95-A will increase the range of services and applications that can be supported. For an IS-99 based system, an increase in the number of services and applications that the system may support will require that the system support data services having different bandwidth, delay sensitivity and quality of service requirements (QoS).

Different bandwidth, delay sensitivity and quality of service requirements may require different bit error rate(BER), and, delay requirements. A fixed frame header and fixed NAK retransmission procedure such as that of IS-99 may not be optimally configured for certain data services that must be supported. For example, it may be that a service with low QoS requirements (high BER allowed) may experience large delays from a NAK retransmission procedure in a system having a predetermined number of retransmissions, when it is not really necessary to retransmit missing data frames the predetermined number of times in order to provide acceptable service. Another example of non-optimization in a data packet service using a fixed frame header, such as that of IS-99, could occur if a service required high bandwidth and included large numbers of sequenced data frames to be transmitted as high speed data. This service may use long data sequences having a number of data frames greater than X, which is the maximum number indicated by the full SEQ field of the fixed frame header. In this case, the count in the SEQ field would have to be restarted before a long data sequence was finished. Restarting the count in the sequence field may require more complicated processing of the transmitted and received data than having each frame in the data sequence numbered sequentially. Additionally, if a data service uses a shorter data sequence having a number of data frames less than the maximum number indicated by the SEQ field, this may be nonoptimal because bits reserved for the SEQ field go unused in each data frame, when these bits could be used to carry data.

OBJECTS OF THE INVENTION

It is a first object of this invention to provide an efficient method and apparatus for transmitting data in a telecommunications network that overcomes the foregoing and other problems.

Another object of this invention is to provide a method and apparatus for dynamically configuring a radio link protocol for a particular type of data service in which the radio link protocol is to be used.

Another object of this invention is to provide a method and apparatus for dynamically configuring the number of bits to be included in a sequence numbering field of a radio link protocol frame.

A further object of this invention is to provide a method and apparatus for dynamically configuring the value of a retransmission count used to control the number of negative acknowledgements to be sent from an intended receiver, when a expected radio link protocol frame is not received at the intended receiver.

SUMMARY OF THE INVENTION

The foregoing and other problems are overcome and the objects of the invention are realized by methods and apparatus in accordance with embodiments of this invention.

The present invention provides a method and apparatus for dynamically configuring parameters of the radio link protocol layer in a telecommunications system. The method and apparatus allows dynamic configuration of the radio link protocol layer in order to optimize parameters for use with a particular data service. The radio link protocol parameters may include parameters specifying the configuration of radio link protocol frames and/or other parameters controlling radio link protocol transmissions. The method and apparatus utilizes a configuration procedure that is performed prior to initiation of the data service between two communicating transceiving devices. The configuration may also be performed to reset parameters of the radio link protocol layer during ongoing data service.

During the configuration procedure, parameters may be agreed upon for the radio link protocol to be used in each direction on the radio link between the transceiving devices. The invention provides an advantage over telecommunications systems that use fixed frame headers, and that consequently may require larger amounts of processing when undersized fields have to be reused in the transmission, or that waste potential available bandwidth by under-utilizing the bits of oversized fields. The invention also prevents delays or quality of service degradations that are caused by the retransmission of unreceived data frames a number of times that is either greater or less than is required by a particular data service.

In an embodiment of the invention, a radio link protocol control frame used for configuring a link setup in a data service between two communicating transceiving devices includes a sequence size field that indicates a bit length required for a frame sequence number(SEQ) field to be used in subsequent radio link protocol data frames and radio link protocol control frames. The radio link protocol control frame used for link setup may also include a retransmission field indicating the number of retransmission requests allowed for particular data frames in the data service that have been transmitted but not received. The radio link control frame is used during the initialization or the reset of the links to be used. Radio link control frames may be exchanged between the transceiving devices in order to configure radio link protocol parameters such as the size of the sequence number field and the retransmission request count for each direction on the link.

In order to configure radio link protocol parameters during initialization or to reset the radio link protocol parameters during an ongoing data service, a first transceiving device of the two communicating transceiving devices transmits a first RLP control frame to the second transceiving device. The first RLP control frame includes a sequence size field, a retransmission request field, and a field indicating that the frame includes the sequence size field and retransmission field. The first RLP control frame indicates to the second transceiving device that it is going to transmit frames to the second transceiving device that includes a (SEQ) field containing the number of bits that is indicated in the sequence size field of the first RLP control frame. The first RLP control frame also indicates to the second transceiving device in the retransmission request field the maximum number of retransmission requests allowed from the second transceiving device, for unreceived data frames transmitted on the link from the first transceiving device to the second transceiving device. The second transceiving device receives the first RLP control frame and configures itself to receive data on the link from the first transceiving device to the second transceiving device and transmits retransmission requests for data frames unreceived on that link according to the information received in the first RLP control frame.

The second transceiving device then transmits a second RLP control frame to the first transceiving device. The second RLP control frame also includes a sequence size field, a retransmission field, and a field indicating that the frame includes the sequence size field and retransmission field. The second RLP control frame also includes an indication that the second frame is transmitted in response to receiving the first RLP control frame. The second RLP control frame indicates to the first transceiving device that the second transceiving device is to transmit frames having a sequence number (SEQ) field containing the number of bits that is indicated in the sequence size field. The second RLP control frame also indicates to the first transceiving device, in the retransmission field, a maximum number of retransmission requests allowed from the first transceiving device for unreceived data frames transmitted on the link from the second transceiving device to the first transceiving device. After receiving the second RLP control frame, the first transceiving device configures itself to receive data on the link from the second transceiving device to the first transceiving device and transmit retransmission requests for data frames unreceived on that link according to the information in the second RLP control frame. The first transceiving device then sends a control frame to the second transceiving device in acknowledgement. The first and second transceiving devices then transmit and receive data and control frames accordingly.

BRIEF DESCRIPTION OF THE DRAWINGS

The above set forth and other features of the invention are made more apparent in the ensuing Detailed Description of the Invention when read in conjunction with the attached Drawings, wherein:

FIGS. 3A, 3B and 3C are a pictorial representation of a radio link protocol (RLP) control frame structure employed, in accordance with the invention, by a mobile station and base station to configure the RLP for a communications link between the mobile station and base station;

DETAILED DESCRIPTION OF THE INVENTION

Figure 1:
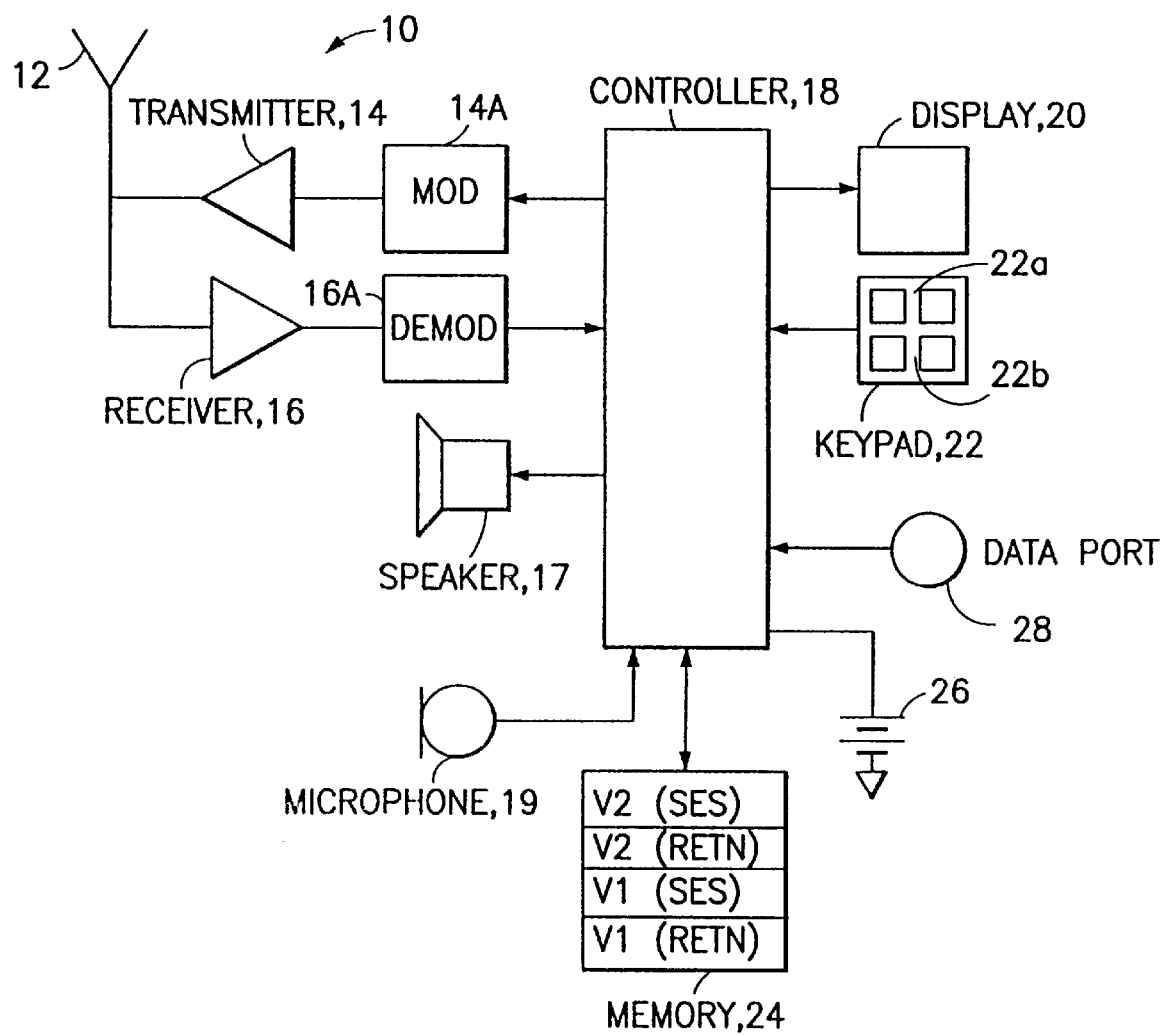
FIG. 1 is a block diagram of a cellular terminal that is suitable for practicing this invention.
Figure 2:
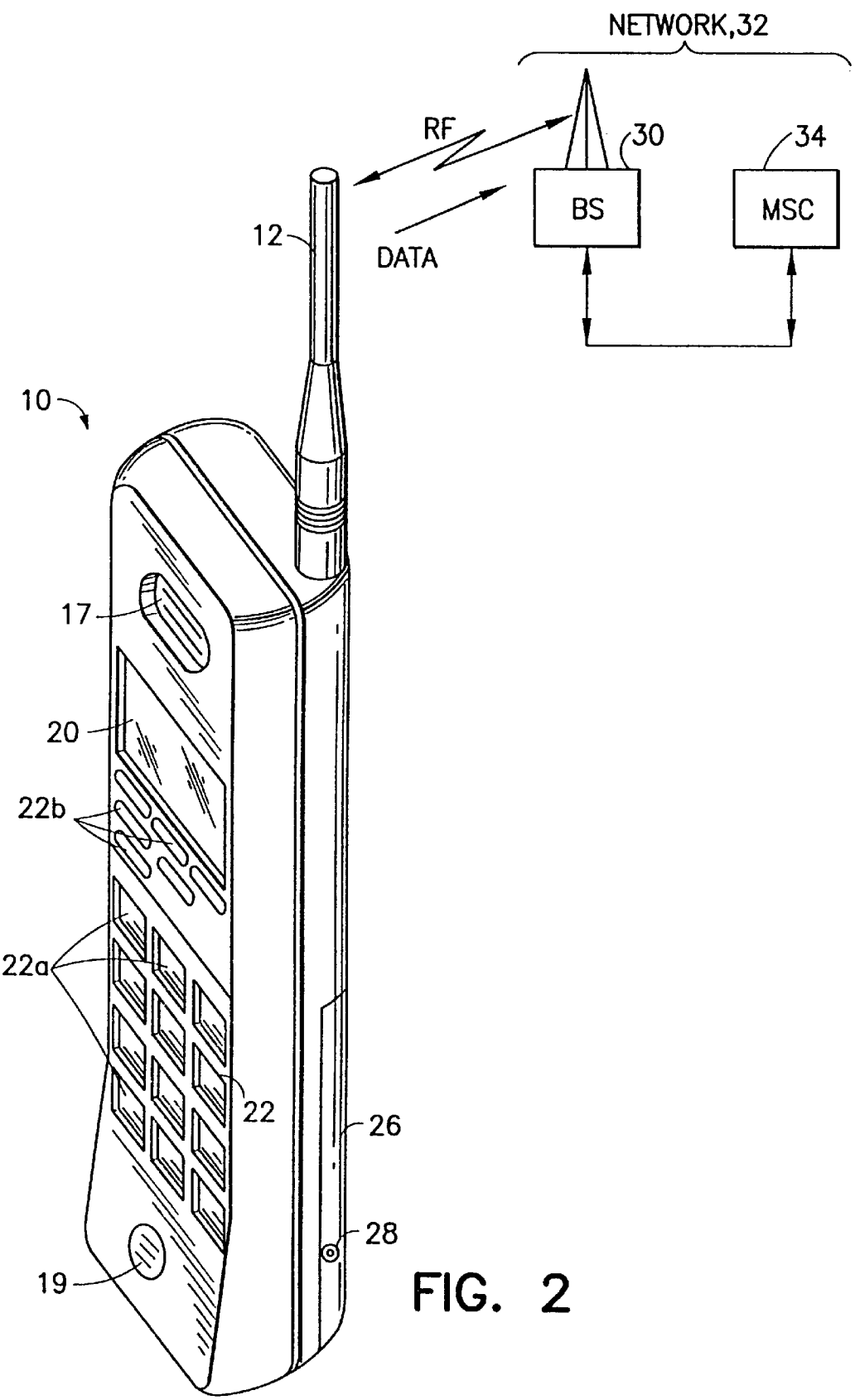
FIG. 2 depicts the terminal of FIG., 1 in communication with a CDMA cellular network.

Referring now to FIGS. 1 and 2, therein are illustrated a wireless user terminal or mobile station (MS) 10 and cellular network 32, that is suitable for practicing this invention. The mobile station 10 includes an antenna 12 for transmitting signals to and, for receiving signals from a base site or base station (BS) 30. The (BS) 30 is a part of cellular network 32 that includes a mobile switching center (MSC) 34. The MSC 34 provides a connection to landline trunks when the MS 10 is involved in a call.

The MS 10 includes a modulator (MOD) 14A, a transmitter 14, a receiver 16, a demodulator (DEMOD) 16A, and a controller 18 that provides signals to and receives signals from modulator 14A and demodulator 16A, respectively. These signals may include signaling information, and also speech, data and/or packet data transmitted between MS 10 and BS 30 in accordance with the air interface standard of the applicable cellular system.

Controller 18 may be comprised of a digital signal processor device, a microprocessor device, and various analog to digital converters, digital to analog converters, and other support circuits. The control and signal processing functions of the mobile station are allocated between these devices according to their respective capabilities. MS 10 also includes a user interface comprised of a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 may also include a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 may store the values of various cellular system parameters and the number assignment module (NAM). An operating program for controlling the operation of controller 18 is also stored in the memory 24 (typically in a ROM device). The memory 24 may also store data prior to transmission or after reception. The memory 24 also includes routines for implementing the method of radio link protocol configuration according to the described embodiment of the invention.

Mobile station 10 may also function as a data terminal for transmitting or receiving data. As such, in this case MS 10 may be connected to a portable computer or a fax machine through a suitable data port (DP) 28.

BS 30 also includes the necessary transmitters and receivers to allow signal exchange with MS 10. Controllers, processors and associated memories that may be located in BS 30 or MSC 34 provide control of the BS 30 and MSC 34, and implement routines for the method and apparatus of radio link protocol configuration according to the described embodiment of the invention.

In the embodiment of this invention the MS 10 and the network 32 operate using a direct sequence, code division multiple access (DS-CDMA) system that is based on the IS-95A system standard. The network may operate in the 800 Mhz frequency range according to IS-95A standard, or, in the 1.8–2.0 Ghz range according to the IS-95 based ANSI-JSTD-008 standard. The network may provide a service option feature based on the IS-99 standard and, may also use high speed data techniques that have been proposed for CDMA based systems to provide higher speed data transmission than is presently provided by the present IS-95A and IS-99 standards.

For example, more than one Walsh channel may be used on the forward link to provide high speed data, by simultaneously carrying separate data that belongs to the same user transmission. On the reverse link, multiplexed channels may be used to increase the data rate. In this method serial data is input to a transmitter/modulator at an input data rate which is higher than the base data transmission rate. The serial data is received over a time period having a duration equal to the duration of the 20 millisecond IS-95 transmission frame and demultiplexed into a plurality of sets of input data. Each of the plurality of sets of input data is then processed in one of a plurality of subchannels using a system channel encoding and interleaving scheme to generate a plurality of sets of processed data. A output serial data stream is then generated by multiplexing the plurality of sets of processed data from the subchannels together. The serial output stream is generated so that the originally received serial data included in the serial output data stream, is generated at the input data rate. The serial output data stream is then spread to generate at least one spread data stream and transmitted on the channel during a second time period having a duration equal to the duration of the IS-95 transmission frame, so that the serial data included in the at least one spread data stream is transmitted at the input data rate.

In accordance with the invention, the IS-99 RLP data and control frames are modified, so that the frames may be used in a RLP configuration process that is performed upon initiation or reset of a data service. Referring now to FIGS. 3A, 3B and 3C, therein are illustrated structures for a RLP control frame 300, an unsegmented RLP data frame 320, and a segmented RLP data frame 340, respectively, that are employed by a mobile station and base station to implement a dynamic RLP protocol in accordance with the invention. RLP control frame 300 includes RLP frame type (CTL) field 302, sequence number (SEQ) field 304, reserved octet length (LEN) field 306, sequence size/first sequence number (SES/FIRST) field 308, retransmission number/last sequence number (RETN/LAST) field 310, reserved (RSVD) field 312, frame check sequence (FCS) field 314, and padding 316. Unsegmented RLP data frame 320 includes CTL field 322, SEQ field 324, LEN field 326, RSVD field 328, DATA field 330 and padding 332. Segmented RLP data frame 340 includes CTL field 342, SEQ field 344, LEN field 346, RSVD field 348, DATA field 350 and padding 352.

In order to implement the embodiment of the invention, the RLP control and data frame structure is modified from the IS-99 structure, so that the positions of the CTL and SEQ fields in the RLP control and data frames have been exchanged as compared to IS-99, and, so that the RLP data frame SEQ fields 324 and 344 are modified to be variable in length. In the RLP control frames, the FIRST and LAST fields have been modified to provide the SES and RETN functions, respectively. In the unsegmented and segmented RLP data frames 320 and 340, the RSVD fields 328 and 348, respectively, have been added to account for the variable length of the SEQ field.

The CTL field 302 indicates the RLP control frame type. CTL field 302 indicates whether the RLP control frame is a negative acknowledgement (NAK) control frame, SYNC control frame, an acknowledgement (ACK) control frame, or a synchronization/acknowleedgment (SYNC/ACK) control frame. LEN field 306 indicates the length of RSVD field in octets and FCS field 314 provides a frame check sequence that provides an error check on the control frame 300. For the unsegmented data frame 320, the CTL field 322 may be one bit and may be set to 0. For the segmented data frame 340, CTL field 342 indicates whether the data frame 340 contains the first, last, or a middle segment of the segmented data. LEN fields 326 and 346 indicate the length of the DATA field 330 and 340, respectively.

The memory associated with the controller in each of the MS 10 and BS 30 includes values stored for V1(ses), V1(retn), V2(ses) and V2(retn). V1(ses) is the value, in bits for the size of the SEQ fields 304, 324 or 344, when a RLP frame is transmitted on the forward link, and V1(retn) is the maximum number of retransmission requests allowed on the reverse link for an unreceived data frame that was transmitted on the forward link. V2(ses) is the value for the size of the SEQ fields 304, 324 or 344 when an RLP frame is transmit on the reverse link and V2(retn) is the maximum number of retransmission requests allowed on the forward link for an unreceived data frame that was transmitted on the reverse link. V1(ses) and V1(retn) are determined in BS 30, and V2(ses) and V2(retn) are determined in MS 10. These values may be determined by the controllers within MS 10 and BS 30 according to information on the data service to be used, for example, based on data rate, number of frames, quality of service, etc., or, the appropriate values may be input to MS 10 and BS 30 from the termination points of the data link, for example, from a fax machine connected to MS 10. The values are then exchanged during radio link protocol configuration so that each of MS 10 and BS 30 has the protocol information for both forward and reverse links. The controllers in MS 10 and BS 30 are configured to format and transmit RLP frames, transmit retransmission requests, and receive RLP frames according to these values.

Figure 4B:
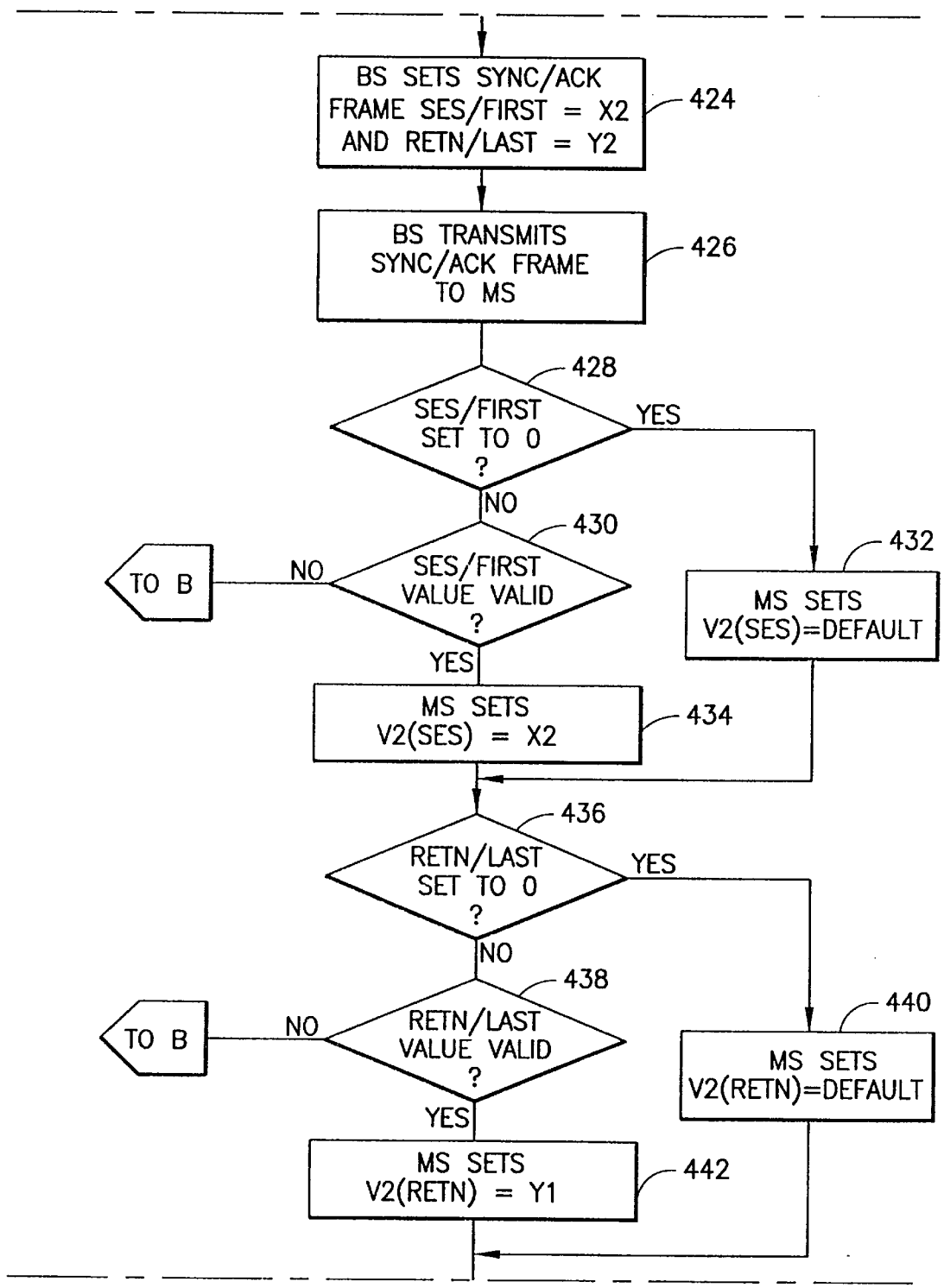
FIG. 4 is a flow diagram illustrating the radio link protocol (RLP) configuration procedure according to the invention, the flow diagram being presented as FIGS. 4A, 4B, and 4C.
Figure 4C:
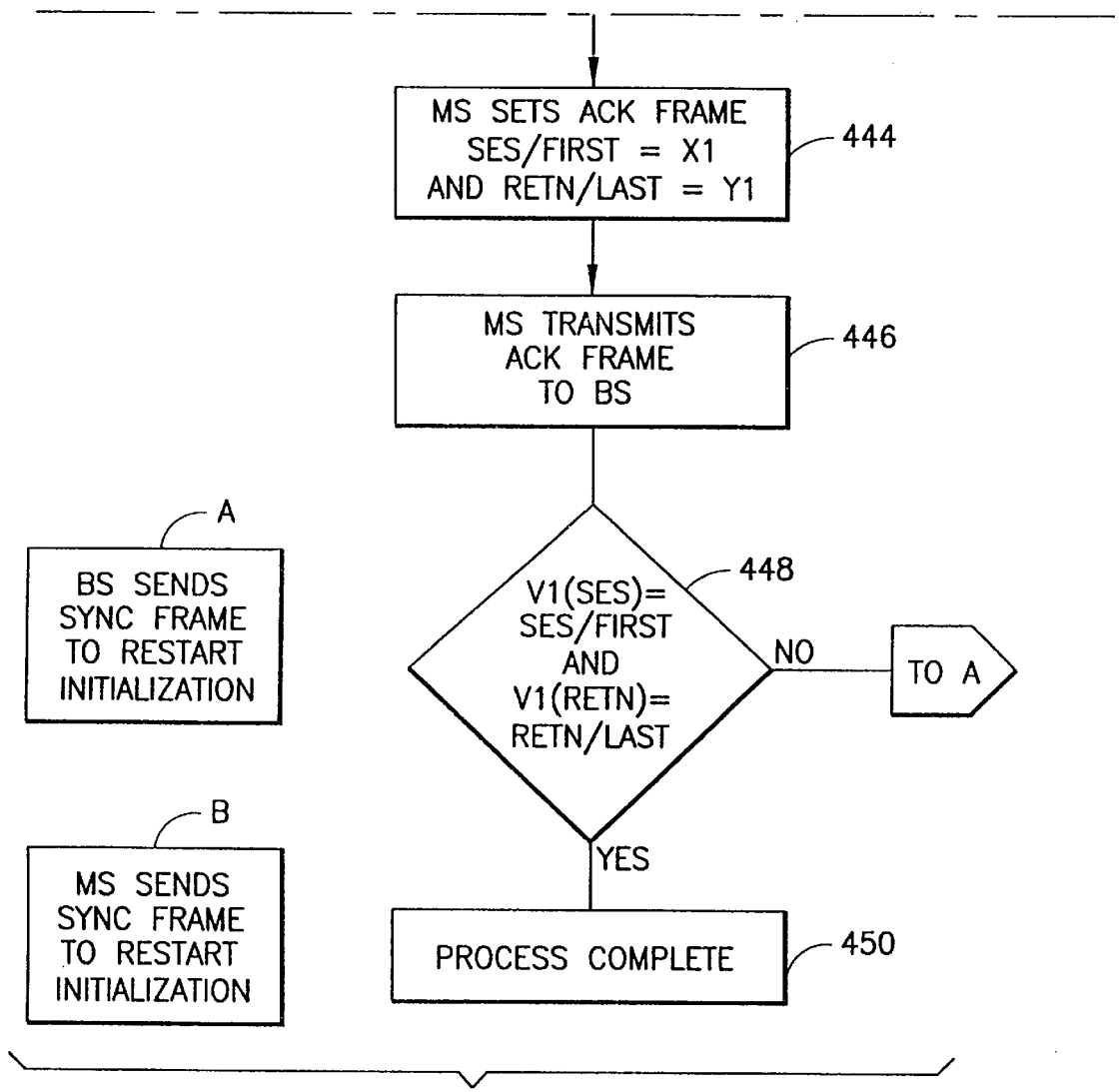

Referring now to FIG. 4, therein is a flow diagram illustrating the radio link protocol configuration procedure according to the invention. In the embodiment of the invention, the procedure of FIG. 4 may be used upon initiation of a data service between MS 10 and network 32 of FIG. 2. The procedure of FIG. 4 may also be used to reset the RLP protocol parameters for a data service after the data service has been initiated. Although described in the context of a mobile station originated synchronization procedure, it should be realized that the process is symmetrical, and that the base station 30 can originate the procedure as well.

The process begins at step 402. The configuration is implemented, preferably, so that the configuration process is embedded in the connection initialization process. The messages exchanged perform the dual function of initializing the connection and configuring the dynamic RLP. At step 404, the RLP configuration process begins using the modified RLP control frames in accordance with this invention. A SYNC control frame (CTL=1101) is formatted within MS 10 having the SES/FIRST field 308 set to the value of X1, and the RETN/LAST field 310 set to the value of Y1. At step 406, MS 10 then transmits the SYNC control frame to BS 30. At step 408, a determination is made within BS 30 as to whether or not SES/FIRST field 308 of the SYNC control frame is set to 0, i.e, whether X1 has been assigned the value of 0. If the SES/FIRST field 308 is set to 0, the process moves to step 412. At step 412, $V_1(ses)$ is set to the default value for the sequence size in bits of the SEQ field 322/344 to be used on the reverse link for RLP data frames. In the embodiment of the invention, the default value may be set to 8. The process next moves to step 416.

If, however, at step 408, it is determined that SES/FIRST field 308 is not set to 0, the process moves to step 410. At step 410, a determination is made within BS 30 as to whether or not the value of X1 in the SES/FIRST field 308 is a valid value. To be considered a valid value, the value of SES/FIRST field 308 must be a value within the predetermined range of from 8 to 12. If the value of SES/FIRST field 308 is not valid, the process moves to the block labeled as "A". In this case the entity detecting the invalid condition restarts the initialization procedure. That is, and by example, if the base station 30 detects an invalid parameter at Block 410, the base station 30 sends a SYNC frame to the mobile station 10. Since the mobile station 10 is expecting a SYNC/ACK frame, the receipt of the SYNC frame indicates to the mobile station 10 that the base station 30 found one or more parameters objectionable, and was replying with base station preferred parameters.

If however, the value of SES/FIRST field 308 is valid, the process moves to step 414. At step 414, V1(ses) is set to X1 within BS 30. BS 30 is now configured to use X1 for the sequence size in bits of the SEQ field 322/344 for RLP data frames 320/340 received on the reverse link from MS 10.

Next, at step 416, a determination is made within BS 30 as to whether the RETN/LAST field 310 of RLP control frame 300 is set to 0, i.e, whether Y1 has been assigned the value of 0. If RETN/LAST field 310 is set to 0, the process moves to step 420. At step 420, $V_1$(retn)) is set to the default value for the maximum number of retransmission requests from BS 30 for unreceived RLP data frames transmit from the MS 10 on the reverse link. In the embodiment of the invention, the default value may be set to 0. The process next moves to step 424.

If however, at step 416, it is determined that RETN/LAST field 310 is not set to 0, the process moves to step 418. At step 418 a determination is made within BS 30 as to whether or not the value of Y1 in the RETN/LAST field 310 is a valid value. To be considered a valid value, the value of RETN/LAST field 310 should be a value within a predetermined range. In the embodiment of the invention the predetermined range may be from 0 to 3. If the value of RETN/LAST field 310 is not valid, the process moves to Block A, as described above, and the synchronization procedure begins again. If, however, the value of RETN/LAST field 310 is valid, the process moves to step 422. At step 422, V1(retn) is set to Y1 within BS 30. BS 30 is now configured to use Y1 for the maximum number of retransmission requests to be allowed from BS 30 for unreceived RLP data frames transmitted from MS 10 on the reverse link.

Next, at base station executed step 424, a SYNC/ACK control frame (CTL=1111) is formatted with SES/FIRST field 308 set to the value of X2 and, the RETN/LAST field 310 set to the value of Y2. At step 426, the BS 30 transmits the SYNC/ACK control frame to the MS 10. Next, at step 428, a determination is made within MS 10 as to whether or not the SES/FIRST field 308 of SYNC/ACK control frame is set to 0, i.e, whether X2 has been assigned the value of 0. If the SES/FIRST field 308 is set to 0, the process moves to step 432. At step 432, V2(ses) is set to the default value for the sequence size in bits of the SEQ field 322/344 to be used on the forward link for RLP data frames. In the embodiment of the invention, the default value may be set to 8. The process next moves to step 436.

If however, at step 428, it is determined that SES/FIRST field 308 is not set to 0, the process moves to step 430. At step 430, a determination is made within MS 10 as to whether or not the value of X2 in the SES/FIRST field 308 is a valid value. To be considered a valid value, the value of SES/FIRST field 308 must be a value within the predetermined range. In the embodiment of the invention, as for V1(ses), the predetermined range may be from 8 to 12. If the value of SES/FIRST field 308 is not valid, the process moves to Block B (in this case equivalent to step 402) where the MS 10 sends a SYNC frame to the BS 30, thereby restarting the synchronization process. If however, the value of SES/FIRST field 308 is valid, the process moves to step 434. At step 434, V2(ses) is set to X2 within MS 10. MS 30 is now configured to use X2 for the sequence size in bits of the SEQ field 322/344 for RLP data frames 320/340 received on the forward link from BS 30.

Next, at step 436, a determination is made within MS 10 as to whether the RETN/LAST field 310 of the SYNC/AK control frame is set to 0, i.e, whether Y2 has been assigned the value of 0. If the RETN/LAST field 310 is set to 0, the process moves to step 440. At step 440, $V_2$(retn)) is set to the default value for the maximum number of retransmission requests allowed from MS 10 for unreceived RLP data frames transmitted from BS 30 on the forward link. In the embodiment of the invention, the default value may be set to 0. The process next moves to step 444.

If however, at step 436, it is determined that RETN/LAST field 310 is not set to 0, the process moves to step 438. At step 438, a determination is made within MS 10 as to whether or not the value of Y2 in the RETN/LAST field 310 is a valid value. To be considered a valid value, the value of RETN/LAST field 310 must be a value within a predetermined range. In the embodiment of the invention, as for V2(retn), the predetermined range may be from 0 to 3. If the value of RETN/LAST field .310 is not valid, the process moves to Block B, as described above. If however, the value of RETN/LAST field 310 is valid, the process moves to step 442. At step 442, V2(retn) is set to Y2 within MS 10. MS 10 is now configured to use Y2 for the maximum number of retransmission requests to be allowed from MS 10 for unreceived RLP data frames transmitted from BS 30 on the forward link.

Next, at step 444, an ACK control frame (CTL=1101) is formatted with SES/FIRST field 308 set to the value of X1 and the RETN/LAST field 310 set to the value of Y1. At step 446, the MS 10 then transmits the ACK control frame to BS 30. The ACK control frame serves as confirmation from MS 10 to BS 30 that the control frames required for configuring the RLP have been exchanged. At step 448, a determination is made within BS 30 as to whether or not the SES/FIRST field 308 of the ACK control frame 300 is set to X1 and whether or not the RETN/LAST field 310 is set to Y1. If the SES/FIRST field 308 is set to X1 and the RETN/LAST field 310 is set to Y1, the configuration is confirmed and the process moves to step 450. At step 450 the configuration process ends, and data transmission between MS 10 and BS 30 proceeds. RLP frames transmitted by MS 10 on the reverse link are received by BS 30 according to X1, and retransmission requests for those are transmitted by BS 30 according to Y1. RLP frames transmitted by BS 30 on the forward link are received by MS 10 according to X2, and retransmission requests for those frames are transmitted by MS 10 according to Y2.

Although described above with respect to certain programmable parameters. (i.e., the sequence number field and number of retransmissions), it is within the scope of this invention to provide other programmable parameters. By example, the number of CRC check bits can be made programmable and can be specified using the signalling described above.

Thus, while the invention has been particularly shown and described with respect to a preferred embodiment thereof, it will be understood by those skilled in the art that changes in form and details may be made therein without departing from the scope and spirit of the invention.

What is claimed is:

1. A method for operating a first transceiver in a telecommunication system having a second transceiver, wherein said first transceiver and second transceiver communicate according to a variable parameter transmission protocol, said method comprising the steps of:

receiving a message from the second transceiver, said message including control information, comprising a retransmission request value specifying a maximum number of retransmission requests to be transmitted from the first transceiver to the second transceiver requesting retransmission of at least one unreceived data frame of at least one data frame transmitted to said first transceiving device from said second transceiving device, said control information further comprising information indicating a length of at least one sequence number field included in each said at least one data frame;

receiving at least one received data frame of said at least one date frame;

determining said at least one unreceived data frame of said at least one data frame;

determining if less than said retransmission request value of retransmission requests has been transmitted for said at least one unreceived data frame;

and, if less than said retransmission request value of retransmission requests has been transmitted, transmitting a retransmission request for said at least one unreceived data frame.

2. A method for communicating between a first transceiving device and a second transceiving device using a transmission protocol having at least one variable parameter, said method comprising the steps of:

transmitting first control information from the first transceiving device to the second transceiving device, said first control information comprising information indicating a length of a first at least one variable length nondata field in a first at least one data frame and a first retransmission requests allowed from said second transceiving device for data frames transmitted from said first transceiving device that are not received at said second transceiving device;

transmitting second control information from the second transceiving device to the first transceiving device, said second control information comprising information indicating a length of a second at least one variable length nondata field in a second at least one variable length nondata field in a second at least one data frame and a second transmission requests value specifying a maximum number of retransmission requests allowed from said first transceiving device for data frames transmitted from said second transceiving device that are not received at said first transceiving device;

storing first control information in the second transceiving device and the second control information in the first transceiving device; and transmitting said first at least one data frame from the first transceiving device to the second transceiving device in accordance with said first control information and transmitting said second at least one data frame from the second transceiving device to the first transceiving device in accordance with said second control information.

3. The method of claim 2, wherein said step of transmitting said first at least one date frame comprises the steps of:

receiving a first plurality of data frames at said second transceiving device;

detecting, at said second transceiving device, at least one unreceived data frame of said first plurality of data frames;

determining if less than said first retransmission value of retransmission requests has been transmitted for said at least one unreceived data frame of said first plurality of data frames;

and, in response to a positive determination in said step of determining, transmitting a retransmission request from said second transceiving device to said first transceiving device.

4. A method for communicating between a first transceiving device and a second transceiving device using a transmission protocol having at least one variable parameter, said method comprising the steps of:

transmitting first control information from the first transceiving device to the second transceiving device, said first control information comprising a first retransmission value specifying a maximum number of retransmission requests allowed from said second transceiving device for data frames transmitted from said first transceiving device that are not received at said second transceiving device;

transmitting second control information from the second transceiving device to the first transceiving device, said second control information comprising a retransmission value specifying a maximum number of retransmission requests allowed from said first transceiving device for data frames transmitted from said second transceiving device that not received at said first transceiving device;

storing the first control information in the second transceiving device and the second control information in the first transceiving device; and subsequently, transmitting a first plurality of data frames from the first transceiving device to the second transceiving device;

receiving at least one received data frame of said first plurality of data frames at said second transceiving device;

detecting, at said second transceiving device, at least one unreceived data frame of said first plurality of data frames;

determining if less than said first retransmission value of retransmission requests has been transmitted for said at least one unreceived data frame of said first plurality of data frames;

and, in response to a positive determination in said step of determining, transmitting a first retransmission request from said second transceiving device to said first transceiving device.

5. The method of claim 4, wherein said first control information further comprises information specifying a length of a first at least one variable length nondata field in said first at least one data frame, and wherein said second control information further comprises information indicating a length of a second at least one variable length nondata field in said second at least one data frame.

6. An apparatus for operation in a first transceiver of a telecommunication system having a second transceiver, wherein said first transceiver and second transceiver communicate according to a variable parameter transmission protocol, said apparatus comprising:

a receiver for receiving a message from the second transceiver, said message including control information, comprising a retransmission request value specifying a maximum number of retransmission requests to be transmitted from the first transceiver to the second transceiver requesting retransmission of at least one unreceived data frame of at least one data frame transmitted to said first transceiving device from said second transceiving device, said control information further comprising information indicating a length of at least one sequence number field included in each said at least one data frame;

a transmitter;

a memory device; and a controller coupled to said receiver, said transmitter and said memory device, said controller for receiving said control information from said receiver according to said control information, storing said control information in said memory device, and processing said at least one data frame by determining at least one unreceived data frame of said at least one data frame, determining if less than said retransmission request value of retransmission requests has been transmitted for said at least one unreceived data frame, and if less than said retransmission request value of retransmission requests has been transmitted, initiating transmission of a retransmission request from said transmitter.

7. An apparatus for communicating between a first transceiving device and a second transceiving device using a transmission protocol having at least one variable parameter, said apparatus comprising:

means for transmitting first control information from the first transceiving device to the second transceiving device, said first control information comprising information indicating a length of a first at least one variable length nondata field in a first at least one data frame and a first retransmission request value specifying a maximum number of retransmission requests allowed from said second transceiving device for data frames transmitted from said first transceiving device that are not received at said second transceiving device;

means for transmitting second control information from the second transceiving device to the first transceiving device, said second control information comprising information indicating a length of a second at least one variable length nondata field in a second at least one variable length nondata field in a second at least one data frame and a second transmission request value specifying a maximum number of retransmission requests allowed from said first transceiving device for data frames transmitted from said second transceiving device that are not received at said first transceiving device;

means for storing the first control information in the second transceiving device and means for storing the second control information in the first transceiving device;

means for transmitting said first at least one data frame from the first transceiving device to the second transceiving device in accordance with said first control information and means for transmitting said second at least one data frame from the second transceiving device to the first transceiving device in accordance with said second control information.

8. An apparatus for communicating between a first transceiving device and a second transceiving device using a transmission protocol having at least one variable parameter, said apparatus comprising:

means for transmitting first control information from the first transceiving device to the second transceiving device, said first control information comprising a first retransmission value specifying a maximum number of retransmission requests allowed from said second transceiving device for data frames transmitted from said first transceiving device that are not received at said second transceiving device;

means for transmitting second control information from the second transceiving device to the first transceiving device, said second control information comprising a retransmission value specifying a maximum number of retransmission requests allowed from said first transceiving device for data frames transmitted from said second transceiving device that not received at said first transceiving device;

means for storing the first control information in the second transceiving device and means for storing the second control information in the first transceiving device; and means for transmitting a first plurality of data frames from the first transceiving device to the second transceiving device;

means for receiving at least one received data frame of said first plurality of data frames at said second transceiving device;

means for detecting, at said second transceiving device, at least one unreceived data frame of said first plurality of data frames;

means for determining if less than said first retransmission value of retransmission requests has been transmitted for said at least one unreceived data frame of said first plurality of data frames; and means for transmitting a first retransmission request from said second transceiving device to said first transceiving device in response to a positive determination in said means for determining.

9. The apparatus of claim 7, wherein said first control information further comprises information specifying a length of a first at least one variable length nondata field in said first at least one data frame, and wherein said second control information further comprises information indicating a length of a second at least one variable length nondata field in said second at least one data frame.

10. The method of claim 8, wherein said information further includes a retransmission request value specifying a maximum number of retransmission requests to be transmitted from said first transceiver to said second transceiver requesting retransmission of unreceived data frames of said at least one data frame, and wherein said step of processing further comprises the steps of determining at least one unreceived data frame of said at least one data frame, determining if less than said retransmission request value of retransmission requests has been transmitted for said at least one unreceived data frame, and if less than said retransmission request value of retransmission requests has been transmitted, initiating transmission of a retransmission request to the second transceiver from said transmitter.

* * * * *